3,527,734
PREPARATION OF CYLOBUTANEDIOL POLYCARBONATES BY DIRECT PHOSGENATION
Markus Matzner, Highland Park, N.J., assignor to Union Carbide Corporation, a corporation of New York
No Drawing. Filed June 7, 1965, Ser. No. 462,119
Int. Cl. C08g 17/13
U.S. Cl. 260—77.5     10 Claims

ABSTRACT OF THE DISCLOSURE

Process for the production of a polycarbonate from the phosgenation of a cyclobutanediol which comprises reacting at a temperature of from about 10° C. to about 150° C., a cyclobutanediol reactant containing a predominant amount of a cyclobutanediol in the presence of an organic compound containing a sterically unhindered heterocyclic, tertiary nitrogen atom, the organic compound being liquid at the reaction temperature, with an amount of phosgene which is less than about 99 percent of an equal mole amount, based on the amount of the diol, and thereafter adding at least the ultimate one percent of the total phosgene at a rate not to exceed one percent of the stoichiometric quantity per four minute period, and binding the formed hydrogen chloride with the organic compound.

---

The present invention relates to a process for producing polycarbonate resins from cyclobutandiol by direct phosgenation of the diol.

It has been long known in the art that various phenols could be effectively converted to high quality, high molecular weight polycarbonate resins by the direct phosgenation of such diols. Such polycarbonate resins and their preparation are thoroughly discussed in an article by Dr. H. Schnell in Angew. Chem. 68, 633–640 (1956). In this article the preparation of a large number of aromatic type polycarbonates are discussed.

The aliphatic polycarbonates have, however, not been amenable to production by direct phosgenation. Various aliphatic polymers of moderately high molecular weight have been produced by such indirect method as transesterification. It has recently been found that polycarbonate resins produced from various alkyl substituted cyclobutanediols provide exceptional characteristics heretofore unattainable from such polycarbonates. These enhanced properties include outstanding weathering characteristics, heat and light stability, enhanced strength properties and inertness. Until the present time, however, it has not been possible to produce high molecular weight polycarbonate resins based on a cyclobutanediol, by direct phosgenation of the diol.

In accordance with this invention high molecular weight carbonate resins of cyclobutanediols are provided by direct phosgenation of the diol. This is accomplished by reacting less than 99 percent of a stoichiometric amount of phosgene with the diol reactant comprising a predominant amount of cyclobutanediol, in the presence of from about 2 to about 20 parts by weight per part diol reactant of an organic, sterically unhindered, heterocyclic tertiary nitrogen containing compound which is liquid at the reaction temperature, conducting the reaction at a temperature of from about 10° C. to about 150° C. and thereafter adding at least the ultimate one percent of the total phosgene at a rate not to exceed one percent of the stoichiometric quantity per four minute period.

By the term "diol reactant" is meant the cyclobutanediol or mixture of cyclobutanediol with other aliphatic or cycloaliphatic diols wherein the cyclobutanediol is present in a predominant amount.

The term "cyclobutanediol" is intended to include both cyclobutanediol per se and the alkyl substituted cyclobutanediols. The cyclobutanediols preferably have the hydroxyl substituents situated on opposing carbon atoms such as positions 1 and 3 on the cyclobutane ring. Such diols can be represented by the formula:

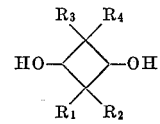

wherein $R_1$, $R_2$, $R_3$, and $R_4$ are either hydrogen or lower alkyl groups containing from one to four carbon atoms inclusive. In respect to the polymer produced it is most preferred to use 2,2,4,4-tetramethyl-1,3-cyclobutanediol as the predominant diol reactant. Accordingly this diol shall be used hereinafter as representative of useful cyclobutanediols.

While it has been indicated above that the predominant constituent of the diol reactant should be a cyclobutanediol, it will be appreciated that in the preparation of cyclobutanediol carbonate homopolymers, this diol constitutes the entire diol reactant. However, when cyclobutanediol carbonate copolymers are prepared then the cyclobutanediol constitutes at least fifty percent of the diol reactant. In the preparation of the carbonate copolymers, one or more other aliphatic or cycloaliphatic diol co-reactants constitute the remainder of the diol reactant. Such diol co-reactants include those containing from 3 to 12 carbon atoms inclusive and those in which oxygen atoms have been substituted for carbon atoms in the chain or ring to provide ether diols, as are well known in the art.

Illustrative of the aliphatic diols which can be used as co-reactants are propanediol, butanediol, pentanediol, diethylene glycol, hexanediol, heptanediols, octanediols, decanediols, dodecanediols, triethylene glycol, and the like.

Illustrative of the cycloaliphatic diols which can be used as co-reactants are cyclopentanediol, cyclohexanediol, furanediol, cyclohexanedimethanol, cyclohexanediethanol, bis(hydroxyethoxy)cyclohexane, dipropylcyclohexanediol, and the like.

In the conduct of the present process it is critical that the reaction proceed in the presence of an organic compound containing a sterically unhindered, heterocyclic tertiary nitrogen atom and preferably from about 4 to about 8 carbon atoms inclusive such compounds serve as catalysts in the reaction. It is believed that this catalyst is effected by the acceptance of generated hydrochloric acid by the unhindered heterocyclic tertiary nitrogen atom which neither otherwise reacts within the system nor combines with or adversely affects the diol reactant or phosgene.

Preferably the catalysts used in this invention are nitrogen containing, heterocyclic compounds subject to the same criteria established above. While these catalysts can contain substituents in positions which do not sterically hinder the heterocyclic tertiary nitrogen atom such substituents must be inert to the phosgene and diol reactants under the conditions of the reaction. For this reason these catalysts cannot contain reactive substituents such as hydroxyl groups, carboxyl groups, primary or secondary amine groups or the like. Similarly it should be noted that substituents which are made inactive by virtue of masking groups such as hydrocarbon groups, for example lower alkyl groups, are not offensive. Preferred substituents when present are lower alkyl groups although unsubstituted heterocyclic tertiary nitrogen containing compounds are most preferred.

Illustrative of such sterically unhindered, heterocyclic tertiary nitrogen containing compounds are pyrimidine, pyridine, N-alkyl substituted imidazole, quinoline, and the like. It should be noted that the tertiary nitrogen containing catalyst can contain inert substituents such as alkyl groups, chloro groups, fluoro groups, nitro groups, and the like, provided such substituents are positioned such that they do not sterically hinder the heterocyclic tertiary nitrogen atom.

Pyridine and pyridines substituted with inert substituents, especially lower alkyl groups in positions 3, 4 and 5 are preferred catalysts.

Illustrative of the effect of steric hinderance it has been found that for pyridine, by way of example, inert substituents located in positions other than 2 or 6 that is to say 3, 4 or 5 substituted pyridines provide effective catalysis. In comparison pyridine similarly substituted in either the 2 or 6 position provides little if any catalytic effect.

Since the pyridines provide an exceptionally high degree of catalysis and also because they are readily available and easily separated they are preferred catalysts in the conduct of the process of this invention.

The heterocyclic tertiary nitrogen containing catalyst is most desirably a liquid at the temperature at which the reaction is conducted, as the catalyst is brought into more intimate contact with the reactants, is more readily dispersed, and is more effectively separated from the reaction products. Additionally the presence of a liquid inert diluent or solvent can be used and preferably is used within certain limits to reduce the amount of catalyst used, and to increase dispersion of the catalyst.

It should be noted that it is not sufficient to utilize a mere catalytic or equivalent amount of catalyst in the conduct of this invention. While such an amount is sufficient to bind hydrogen chloride molecules formed during the reaction, it is insufficient in this invention, as the presence of such a minor amount of catalyst results in insufficient reaction and tends to favor undesirable side reactions. In this invention the heterocyclic tertiary nitrogen containing catalyst should be used in an amount of from about 2 to about 20 parts by weight of the heterocyclic tertiary nitrogen containing catalyst per part diol reactant used. It is preferred however to use from about 3 parts to about 10 parts by weight per part diol reactant used. The preferred amounts provide completely effective catalysis and facilitate removal from the product.

It is also contemplated in this invention that non-reactive diluents or solvents be utilized in the reaction medium. The utilization of such solvents or diluents is in fact preferred as the viscosity of the reaction mixture is thereby reduced and accordingly the agitation and transfer of such mixtures is facilitated.

Any suitable non-reactive or inert solvent or diluent can be used for this purpose. Illustrative of suitable inert solvents are benzene, chlorobenzene, toluene, xylene, tetrachloroethylene, carbon tetrachloride, chloroform, methylene chloride, and the like.

Considering the solvent and tertiary nitrogen containing catalyst as both being part of the solvent or diluent system, the catalyst should comprise from 20 to 100 percent by weight of the solvent system the remaining 80 to 0 percent being suitable inert solvent or diluent. It has been found desirable however, to utilize a solvent system comprising from 20 to 60 percent by weight of the catalyst and from 80 to 40 percent by weight of a suitable solvent based on the total solvent system. Since the quantity of catalyst used in the reaction system is determined in reference to the amount of diol reactant utilized as indicated above, the appropriate quantity of solvent or diluent utilized is readily determined in reference to the catalyst.

While the exact nature of the present reaction is not known, and applicant does not intend to be bound by theory, it is believed that the subject reaction progresses through at least two different phases. If competing reactions and side reactions are not considered, it is possible to postulate an idealized reaction mechanism in two stages which is believed to exemplify this reaction:

Reaction I

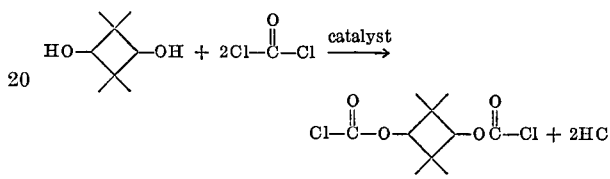

Reaction II

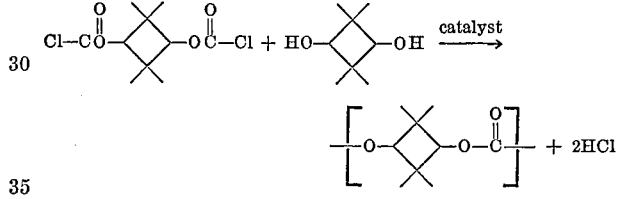

While these reactions would appear to be quite similar they differ in one important respect. Reaction I is a phosgene-hydroxyl interaction while Reaction II involves a chloroformate-hydroxyl interaction. Reaction I exhibits a high reaction rate and progresses quite easily. Reaction II exhibits a relatively slow reaction rate and has been found to be more effectively conducted under higher temperatures in order to force the reaction to completion. In a reaction where phosgene is gradually added to a solution of the diol it is believed to be essential that the intermediate chloroformate be consumed as rapidly as it is formed. If this consumption is not effected, an accumulation of the chloroformate species results. This, therefore, would appear to require a precise metering system of a highly toxic gas which is undesirable. Unexpectedly it was discovered that the use of a large excess of the nitrogen-containing catalyst promotes the desired rate. The data set forth in Example I below clearly shows that a very appreciable increase in the reaction rate is observed when excesses of the nitrogen catalyst are used.

The direct phosgenation reaction of this invention is generally conducted at temperatures in the range of from about 10° C. to about 150° C. When the phosgenation reaction is conducted by a continuously slow rate of addition a single temperature within this range can be used to effect the phosgenation. It is preferred however to utilize a temperature in the range of from 50° C. to 130° C. When such a continuous addition is effected at a low temperature, for example less than 60° C., it is desirable to heat the polymer to a higher temperature, for example from about 80° C. to about 130° C., after the addition is complete in order to increase the molecular weight of the polymer.

While a slow rate of addition can be effectively used to conduct the phosgenation of this invention it has been found preferable to effect the phosgenation in two additions: an initial addition at a rapid rate and a final addition at a slow rate. When the two addition phosgenation method of this invention is used, it has been found that while the first amount of phosgene added is not especially critical, it is highly critical that at least the last one percent be added at the slow rate.

While the slow rate of addition can be extended over a long period of time limited only by the practicability of the addition period at least the last one percent should be added over a period of no less than about 4 minutes and preferably over a period of from about 5 minutes to about four hours. It will be appreciated by those skilled in the art that the amount of material reacted will to some extent determine the rate. For example very large amounts would generally be extended over a longer period of time.

While as indicated above at least the ultimate one percent of the stoichiometric amount of phosgene must be added at the slow ratet, it has been found that excellent results are obtained when the amount of phosgene added in the first addition be from about 90 to about 99 percent of the stoichiometric amount of phosgene and that this addition be accomplished in a period of from about ten minutes to about two hours, and the last one to ten percent be added at the slow rate from about 4 to about 20 minutes or more per percent of the stoichiometric amount added in the ultimate charge. When the two addition charge is utilized it is desired to add the first or "fast rate" portion of phosgene at a temperature less than 60° C. within the temperature limits indicated above and preferably at a temperature of from 10° C. to 80° C. The ultimate portion or "slow rate" portion of phosgene is desirably added at a temperature greater than 80° C. within the temperature limits established above and preferably at a temperature of from 100° C. to 110° C. The two portion addition is preferred over the single slow rate addition because the total time of addition is much less to produce substantially the same reaction efficiencies. The indicated temperature preferences are predicated on the enhanced yields of polymer exhibiting high molecular weight.

The most preferred method however has been found to be a three-step addition in which the "fast-rate" portion is added in two parts wherein from about 30 to 49 percent of the stoichiometric amount is added at a rapid rate at a temperature of from 10° to 40° C. and from 69 to 50 percent of the stoichiometric amount of phosgene is added at a rapid rate at a temperature of from about 60° to about 75° C. and at least the ultimate one percent is added and generally the ultimate from 10 to 1 percent of the stoichiometric amount is added at the slow rate at a temperature in excess of 100° C., preferably from about 100° C. to about 130° C.

The three portion addition is most preferred in the conduct of this process because the polymer produced is "gin white" in color. It will be readily appreciated by those skilled in the art that it is exceedingly difficult to produce polymers of this type which are even substantially color-free.

The slow addition rate of the ultimate portion of phosgene is believed to be desirable because of the low concentration of reactive hydroxyl groups that are present in the reaction mixture toward the end of the reaction. A rapid rate of phosgene addition throughout the reaction causes rapid saturation of the remaining hydroxyl groups. This in turn tends to result in a low molecular weight, chloroformate terminated polymer. It should be noted that the reaction requires only an approximate control of the addition of phosgene. Sophisticated metering equipment is unnecessary. The end point in the reaction is signaled by a considerable increase in the viscosity of the mixture thereby indicating the presence of a high polymer.

It will be noted that the reactions of this invention should be conducted in the absence of air. This avoids undesirable oxidative side reactions which lead to the formation of undesirable and contaminating colored byproducts. In practice this is readily effected by conducting the reaction under a blanket of inert gas, such as argon, helium, neon, or the like.

While it is not critical, the total reaction time should be preferably kept as low as possible. In practice total reaction times of from 1 to 2 hours should be sufficient, as indicated by the results of Example I. Reaction cycles less than this can be utilized, however, provided the critical addition rates indicated above are employed. The preference for lower reaction cycles is dictated by product resins exhibiting improved color and reaction efficiencies.

The present process is effective for compounds having commercial grade purity. It is not required to use highly purified or reagent grade materials.

The isolation of the polymer is easily effected by filtering the polymer solution upon completion of the reaction. The filtrate is washed in acid, then washed in water. The polymer is isolated by either evaporation of the solvent or by coagulation in a non-solvent. It should be noted and appreciated that variations in this process can be readily effected without departing from either the scope or the spirit of the present invention, for example, phosgene can be added to the cyclobutanediol reactant catalyst mixture, not as a gas, but rather as a liquid. A solution of cyclobutanediol can be added to a solution of phosgene in the solvent catalyst mixture. Instead of phosgene, bromo, iodo, and fluoro phosgene can also be used.

As has been indicated above, the preparation of cyclobutene based polycarbonates has been effected by transesterification techniques. By this process a prepolymer is prepared having a low reduced viscosity which is subsequently polymerized by heat to a polymer having a reduced viscosity generally in excess of 1.6. Commercially acceptable polymers of this class generally exhibit a reduced viscosity of from about 0.4 to 1.5. Such commercially acceptable polymers can easily be prepared by the process of this invention.

Furthermore, polymers prepared by the process of this invention are free of phenol or alcohol and catalyst residues which hamper the polymers of the prior art and lead to discolored polymers having poor thermal stability. It is therefore believed that the polymers of this invention are patentably distinct over those of the prior art.

It will be further appreciated that while this invention is directed to a direct method of preparing carbonate polymer resins from cyclobutanediols such as 2,2,4,4-tetramethyl-1,3-diol by phosgenation rate studies can advantageously be conducted on staged reactions whereby the diol under study is phosgenated under conditions suitable to produce the dichloroformate analog which is purified, separated and subsequently reacted with the purified diol. Such staged or phased reactions serve to eliminate side product formation and side reactions and the particular rate or catalyst studies can be then conducted without undue consideration of competing reactions. This type of reaction is a "model" reaction and is exemplified in Example I below.

In the examples which follow, reduced viscosity was determined at a concentration of 0.2 gram of polymer per 100 milliliters of chloroform at a temperature of 25° C.

EXAMPLE 1

This example typifies an idealized model reaction in which 2,2,4,4-tetramethyl cyclobutane dichloroformate was reacted with 2,2,4,4-tetramethyl cyclobutanediol-1,3 under carefully controlled conditions to determine reaction rates in different solvent systems and in the presence of different amounts of pyridine catalyst. This reaction additionally illustrates the final stage of the direct phosgenation reaction except that side reactions have been minimized. In this example each reaction was conducted utilizing a 1:1 chloroformate to hydroxyl ratio (.010 mole 2,2,4,4-tetramethyl cyclobutanediol-1,3 and .010 mole of pure 2,2,4,4-tetramethyl cyclobutane-1,3-dichloroformate).

Table I which follows indicates the reaction time, reaction temperature, solvent system and catalyst concentration for each reaction.

TABLE I.—EFFECT OF PYRIDINE CATALYST ON REACTION RATES

| Time of reaction | Sample 1: Control toluene solvent equivalent amount[1] of pyridine, reflux temp. (110° C.), 1.6 grams pyridine | Sample 2: No solvent, total pyridine system, reflux reaction temp. (115° C.), 30 grams pyridine, reduced viscosity | Sample 3: Benzene solvent pyridine 1:1 to solvent (by volume), reflux temp. (90° C.), 15 grams pyridine | Sample 4: Toluene solvent pyridine 1:1 (by volume), reflux temp. (112° C.) 15 grams pyridine | Sample 5: Xylene solvent pyridine 1:1 (by volume), reflux temp. (127° C.), 15 grams pyridine |
|---|---|---|---|---|---|
| 5 minutes | | 0.23 | 0.18 | 0.41 | 0.44 |
| 10 minutes | | 0.41 | 0.22 | 0.72 | 0.60 |
| 30 minutes | | 1.42 | 0.70 | 1.02 | |
| 60 minutes | 0.18 | | | | |
| 120 minutes | 0.49 | | | | |
| 180 minutes | 0.59 | | | | |
| 300 minutes | 0.63 | | | | |
| 1080 minutes | 0.90 | | | | |

[1] Equivalent amount of pyridine is that amount which is calculated to merely react with the hydrogen chloride generated by the reaction and is that amount which would normally be used as a catalyst in this type of reaction.

From the model reactions set forth in Example I it can be seen that the effect of using an equivalent amount of pyridine provides low final reaction rates resulting in polymers of relatively low molecular weight. It can be also seen that when pyridine catalyst is used in considerable excess of the equivalent amount the final reaction rates are greatly increased to produce high molecular weight commercial grade polymer in very short periods of time.

EXAMPLE 2

Effect of sterically hindered heterocyclic and non-heterocyclic tertiary nitrogen containing catalysts In this experiment 0.01 mole of 2,2,4,4-tetramethylcyclobutane-1,3 dichloroformate and 0.01 mole of 2,2,4,4-tetramethyl cyclobutanediol-1,3 were reacted in each of two reactions. In the first reaction an equivalent amount of pyridine catalyst (1.66 grams) was used with 30 milliliters of triethylamine as solvent. In the second 1.66 grams of pyridine catalyst was used with approximately 30 milliliters of 2-picoline.

In each reaction the diol, dichloroformate and 20 milliliters of the sterically hindered tertiary nitrogen containing solvent were mixed and heated to reflux under a dry argon atomsphere. The initially colorless mixture became yellow although no solubilization resulted. The pyridine and the remaining 10 milliliters of solvent were then added and a brown color developed. Refluxing for a period of 30 minutes. The final mixture was brown. Coagulation with methanol failed to yield polymer.

This experiment serves to illustrate that sterically hindered tertiary nitrogen compounds even heterocyclic compounds do not serve to catalyze the reaction of dichloroformate and diol of this reaction. The particular sterically hindered compounds used, triethylamine and 2-picoline in fact even interfere with this reaction in the presence of an equivalent amount of pyridine.

EXAMPLE 3

A five-hundred milliliter flask provided with a stirrer, argon and phosgene inlet tubes, a reflux condenser and thermometer was utilized as a reaction chamber. The gas inlet tubes are arranged in a manner such that the argon efflux is circulated over the surface of the liquid phase while the phosgene is introduced into the reaction mixture.

An initial charge of 18.03 grams (0.125) of 2,2,4,4-tetramethyl-1,3-cyclobutanediol, 120 milliliters of toluene and 80 milliliters of pyridine were introduced to the reaction chamber. This initial charge was stirred and heated. Dry argon gas was circulated over the surface of the reaction mixture. The temperature of this initial charge was brought to reflux and maintained at this temperature. Within a period of six minutes after attainment of reflux temperature 98% of the stoichiometric amount of phosgene was added. Within a period of seconds from the start of phosgene addition the mixture became cloudy, and within a minute thereafter a copious white precipitate of pyridine hydrochloride formed. At the end of the six minute period, the reaction mixture contained low molecular weight 2,2,4,4-cyclobutane-1,3-diol carbonate polymer. The rate of phosgene addition was thereupon decreased considerably, and the addition of the remaining 2 percent by weight of phosgene was continued over a period of approximately forty-four minutes. The reaction mixture gradually thickened during this slow addition period and was light-yellow and very viscous at the end of the forty-four minute period. The phosgenation was stopped and the mixture was allowed to cool. The cool reaction mixture was filtered through a bed of diatomaceous earth prepared in toluene. The filtrate was coagulated in approximately two liters of methanol. A white fibrous product was recovered. This product was washed four times with distilled water with agitation in a vortex blender. Each washing was made in two liters of distilled water with five minutes of stirring. The product was dried at a temperature of approximately 80° C. under vacuum until constant weight was obtained. A yield of 80 percent 2,2,4,4-tetramethyl-1,3-cyclobutanediol carbonate polymer was obtained exhibiting a reduced viscosity, at a concentration of 0.2 gram per hundred milliliters of chloroform at 25° C. of 0.66.

EXAMPLE 4

In a manner similar to that described in Example 3 above a series of direct phosgenation reactions were conducted for various reaction periods, temperatures and solvent catalyst concentration. As in the previous example, 200 milliliters of the solvent catalyst system were used. The results and conditions of these reactions are set forth in Table II below.

TABLE II

| Solvent/catalyst system | Concentration | Reflux reaction temperature | Total reaction time (hours) | Polymer reduced viscosity |
|---|---|---|---|---|
| Pyridine | | 115 | 3.25 | 0.95 |
| Toluene/pyridine | 1:1 by volume | 112 | 6 | 0.60 |
| Do. | 6:4 by volume | 111 | 5.2 | 0.84 |
| Xylene/pyridine | 1:1 by volume | 127 | 5.5 | 0.47 |
| Toluene/pyridine | 3:1 by volume | 110 | 3 | 0.26 |

EXAMPLE 5

A copolycarbonate was prepared by the direct phosgenation of 2,2,4,4-tetramethyl-1,3-cyclobutanediol and 1,4-cyclohexanedimethanol. The diol mixture contained 1.81 grams of 1,4-cyclohexanedimethanol and 16.22 grams of 2,2,4,4-tetramethyl-1,3-cyclobutanediol. The diol mixture was charged to a reaction flask with 120 milliliters of toluene and 80 milliliters of pyridine. The resulting solution was water-white. The charged mixture was stirred and the reaction flask was purged with dry argon which continuously circulated over the reaction. The charged mixture was heated to reflux and maintained at reflux for five minutes. The reaction mixture was then cooled to a temperature of about 30° C. Phosgene addition was then initiated at a mixture temperature of 37° C. during which 2 grams of phosgene was added over a period of 7 minutes. The temperature increased to 45° C. during this period and two additional grams of phosgene was added over a period of eight minutes under gentle heating. At a reaction temperature of 65° C., 3.5 grams of phosgene were added and again at a temperature of 71° C., 3.5 additional grams of phosgene was added at a decreasing rate over a period of 30 minutes. The reaction temperature was raised to 109° C. during this period. At the end of this period the mixture was still water-white. The reaction temperature was elevated to 111° C. and the remaining 1.38 grams of phosgene was added over a period of 45 minutes. The solution remained water-white. The pyridine hydrochloride was filtered out of the solution, and the filter bed was washed with 300 milliliters of xylene. The combined filtrate and washings were coagulated in 2 liters of methanol. A white fibrous fluff was obtained. The fluff was washed twice with one liter methanol. The fluff was dried to constant weight at a temperature of 60° C. at a reduced pressure. A yield of 81.4 percent copolymer was obtained. This copolymer exhibited a reduced viscosity in chloroform of 0.84, and was thermally stable.

EXAMPLE 6

The preparation of 2,2,4,4-tetramethyl-1,3-cyclobutanediol carbonate homopolymer by direct phosgenation Eighty milliliters of pyridine catalyst, 18.03 grams of 2,2,4,4-tetramethyl-1,3-cyclobutanediol, and 120 milliliters of toluene were charged to the reaction flask. As in Example 5 the reaction was purged and continuously flooded with dry argon gas, stirred, heated to reflux and so maintained for a period of five minutes. The charged mixture was cooled to a temperature of 29° C., and the addition of phosgene was initiated. Five grams of phosgene was added over a period of ten minutes during which the reaction temperature rose to 38° C. Slight heating was begun. Seven additional grams were added over a period of ten minutes and a reaction temperature from 60–66° C. The temperature was raised to 104° C. and the ultimate 0.38 gram of phosgene was added over a period of one hour and twelve minutes. The temperature during this period was raised gradually to 110° C. at the completion of the addition. The reaction mixture was water-white. This mixture was filtered to remove pyridine hydrochloride and the filter bed was washed with 300 milliliters of toluene. The polymer was coagulated in two liters of methanol. A white fluff was obtained which was washed twice with 1.5 liters of methanol and was subsequently dried as in Example 5. The reaction efficiency was almost 100 percent based on the trans isomer content of diol and polymer. The reaction yield was 60 percent. The polymer exhibited a reduced viscosity of 1.28 measured in chloroform.

What is claimed is:

1. Process for the production of a polycarbonate from the phosgenation of a cyclobutanediol which comprises reacting at a temperature from about 10° C., to about 150° C., a cyclobutanediol reactant in the presence of from about 2 to about 20 parts by weight per part diol reactant of an organic compound containing a sterically unhindered heterocyclic, tertiary nitrogen atom, said compound being liquid at the reaction temperature, with an amount of phosgene which is less than about 99 percent of an equal mole amount, based on the amount of said diol, and thereafter adding at least the ultimate one percent of the total phosgene at a rate not to exceed one percent of the stoichiometric quantity per four minute period, and binding the formed hydrogen chloride with said organic compound.

2. The process as defined in claim 1 wherein the organic compound containing a sterically unhindered heterocyclic tertiary nitrogen atom is pyridine.

3. The process as defined in claim 1 wherein the ultimate one percent of phosgene is added at a temperature in excess of 100° C.

4. The process as defined in claim 1 wherein the cyclobutanediol reactant is 2,2,4,4-tetramethyl cyclobutanediol-1,3.

5. Process for the production of cyclobutanediol polymers by the direct phosgenation of cyclobutanediol comprising reacting from about 90 to about 99 percent of a stoichiometric amount of phosgene with a diol reactant of the formula:

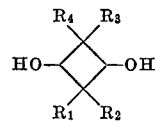

wherein $R_1$, $R_2$, $R_3$ and $R_4$ are selected from the group consisting of hydrogen and lower alkyl groups, at a temperature of less than 60° C. in the presence of from about 3 parts to about 10 parts by weight per part diol of an organic compound containing a sterically unhindered heterocyclic tertiary nitrogen atom which is liquid at the reaction temperature and which contains from about 4 to about 8 carbon atoms inclusive and thereafter adding at least the ultimate one percent of the remaining ten to one percent phosgene at a rate not to exceed one percent of the stoichiometric quantity per four minute period, said addition being conducted at a temperature of from 80° C. to 130° C.

6. The process of claim 5 wherein $R_1$, $R_2$, $R_3$ and $R_4$ are lower alkyl groups and the organic compound containing a sterically unhindered tertiary nitrogen atom is pyridine.

7. The process as defined in claim 5 wherein the reaction mixture contains an inert diluent present in an amount such that the diluent comprises from about 80 to about 40 percent by volume of the combined organic compound containing a sterically unhindered heterocyclic tertiary nitrogen atom and diluent.

8. Process for the production of cyclobutanediol polymers comprising reacting a stoichiometric amount of phosgene with a cyclobutanediol reactant in the presence of from about 2 to about 20 parts by weight per part diol reactant of an organic compound containing a sterically unhindered heterocyclic tertiary nitrogen atom and from about 4 to about 8 carbon atoms, wherein from about 30 to about 49 percent of the stoichiometric amount as the first charge is charged to the reaction mixture at a temperature of from about 10° C. to about 40° C. and from 69 to 50 percent of the stoichiometric amount of phosgene is then added at a reaction temperature of from about 60° to about 75° C. and at least the ultimate one percent of the stoichiometric amount of phosgene is added to the reaction mixture at a temperature of from about 105° C. to 130° C. said ultimate charge being added at a rate not to exceed one percent of the stoichiometric amount of phosgene per four minute period.

9. The process of claim 8 wherein the organic compound containing a sterically unhindered, heterocyclic tertiary, nitrogen atom is pyridine and it is present in an amount of from about 3 parts to about 10 parts by weight per part diol reactant.

10. The process as defined in claim 8 wherein the reaction mixture contains an inert diluent present in an amount such that the diluent comprises from about 80 to about 40 percent by volume of the combined organic compound containing a sterically unhindered heterocyclic tertiary nitrogen atom and diluent.

References Cited

UNITED STATES PATENTS

| | | | |
|---|---|---|---|
| 3,317,466 | 5/1967 | Caldwell et al. | 260—47 |
| 3,375,210 | 3/1968 | D'Onofrio | 260—77.5 |

SAMUEL H. BLECH, Primary Examiner

U.S. Cl. X.R.

260—463

PO-1050
(5/69)

UNITED STATES PATENT OFFICE
CERTIFICATE OF CORRECTION

Patent No. 3,527,734            Dated September 8, 1970

Inventor(s) Markus Matzner

It is certified that error appears in the above-identified patent and that said Letters Patent are hereby corrected as shown below:

Column 4, line 35, the subscript --n-- is omitted from outside of the right hand bracket.

Columns 7-8, lines 4-8, the headings for Samples 1-5 of Table I were not reproduced, line-for-line, as they appear in the application.

Columns 7-8, lines 9-15, the reported values for Samples 1-5 are not identified as reduced viscosity values.

Column 12, the listing of References cited has omitted U.S. 3,157,622-Goldberg; U.S. 3,313,777-Elam et al.; Great Britain 925,139-ICI; France 1,314,023-Union Carbide; Schnell, "Chemistry and Physics of Polycarbonates", Interscience Pub., N.Y., 1964, pages 9-12.

SIGNED AND
SEALED
NOV 17 1970

(SEAL)
Attest:

Edward M. Fletcher, Jr.
Attesting Officer

WILLIAM E. SCHUYLER, JR.
Commissioner of Patents